Patented Oct. 6, 1942

2,298,186

UNITED STATES PATENT OFFICE 2,298,186

ESTER

John C. Woodhouse, Wilmington, and Kenneth E. Walker, Elmhurst, Del., assignor to E. I. du Pont de Nemours & Company, Wilmington, Del., a corporation of Delaware No Drawing. Application October 25, 1939, Serial No. 301,300

23 Claims. (Cl. 260—411)

This invention relates to a process for the preparation of esters and primarily to esters of alkoxy alkoxy alcohols, such as, methoxy methoxy ethanol, and processes for their preparation.

An object of the present invention is to provide new compositions of matter. Another object of the invention is to provide a process for the preparation of organic and inorganic acid esters of alkoxy alkoxy alcohols. A further object of the invention is to provide a process wherein, by ester interchange, an ester of an organic acid can be reacted with an alkoxy alkoxy alcohol to produce the corresponding ester of the acid. Other objects and advantages of the invention will hereinafter appear.

Broadly, the esters of the present invention may be prepared by reacting an alkoxy alkoxy alcohol with a lower alkyl ester of an organic or inorganic acid, in the presence of a suitable ester interchange catalyst, if one is necessary, and recovering from the reaction product the ester produced. More specifically, the invention is realized by reacting, preferably while under reflux, an alkoxy methoxy alcohol with, for example, a lower alkyl ester of an organic acid such as methyl acetate, ethyl acetate, and other organic acid esters which will hereinafter be more fully particularized, preferably in the presence of an ester interchange catalyst.

The alcohols from which valuable esters may be prepared in accord with the process of this invention may be illustrated by the following formula:

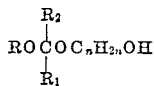

wherein R is a hydrocarbon radical, $R_1$ and $R_2$ are hydrogen or hydrocarbon radicals, and $n$ is an integer greater than 1. More specific examples of these alcohols may be designated by the formula, $ROCH_2O(CH_2)_2OH$, which, generically, represents such alcohols as (methoxy methoxy) ethanol, $CH_3OCH_2O(CH_2)_2OH$; (ethoxy methoxy) ethanol, $C_2H_5OCH_2O(CH_2)_2OH$; (propoxy methoxy) ethanol, $$C_3H_7OCH_2O(CH_2)_2OH$$

(butoxy methoxy) ethanol, $$C_4H_9OCH_2O(CH_2)_2OH$$

(methoxy isopropoxy) ethanol, $$CH_3OC(CH_3)_2O(CH_2)_2OH$$

(methoxy ethoxy methoxy) ethanol, $$CH_3O(CH_2)_2OCH_2O(CH_2)_2OH$$

(alpha-methoxy ethoxy) ethanol, $$CH_3OCH(CH_3)O(CH_2)_2OH$$

and (alpha-ethoxy ethoxy) ethanol, $$C_2H_5OCH(CH_3)O(CH_2)_2OH$$

Similarly, higher substituted alcohols are included such, for example, as (methoxy methoxy) propanol, $CH_3OCH_2O(CH_2)_3OH$; beta-(methoxy methoxy) propanol, $CH_3OCH_2OCH(CH_3)CH_2OH$; (methoxy methoxy) butanol, $$CH_3OCH_2O(CH_2)_4OH$$

and the higher corresponding alcohols as well as their homologues. Other specific examples which may likewise be included are the mono-(methoxy methyl) ether of diethylene glycol, $CH_3OCH_2O(CH_2)_2O(CH_2)_2OH$, as well as the corresponding (ethoxy methyl), (propoxy methyl), (butoxy methyl), (methoxy ethoxy methyl) ethers of diethylene glycol, as well as triethylene glycol. These alcohols are prepared in accord with the process described in the copending application of Sidney Sussman, 288,587, filed August 5, 1939, which involves, primarily, the interaction of an acetal and principally formals with a polyhydric alcohol having at least one unsubstituted hydroxyl group in the presence of a suitable acidic-type catalyst such as sulfuric acid. Another class of alcohols are likewise included which are prepared by the hydrogenation of the product obtained by the process of the copending application of Donald J. Loder et al., S. N. 256,855. These alcohols have the chemical formula, $CH_2OH(CH_2O)_n(CH_2)_2OH$, in which $n$ is one or more.

It has been found that these alcohols may be converted into the corresponding esters by ester interchange of the alcohol with any alkyl ester, for example, the methyl, ethyl, propyl, butyl and higher esters of such acids as formic, acetic, normal and isopropionic, normal and isobutyric, valeric, and the higher straight and branch chain aliphatic organic acids, as well as the aromatic acids such as benzoic, benzoyl benzoic, naphthenic, and toluic acids; the dibasic aliphatic acids such, for example, as oxalic, succinic, malonic, sebacic, phthalic, and adipic acids; the unsaturated acids such as acrylic, methacrylic, crotonic, angelic and oleic acids; and the hydroxy and alkoxy acids such as hydroxy acetic, lactic and methoxy acetic acids. Inorganic esters of the following acids may likewise be prepared, boric, phosphoric, stannic molybdic acids and the like.

Esters may likewise be obtained from these alcohols and the vegetables or animal oil acids such, for example, as the acids obtained from the following oils: almond, blackfish, candlenut, castor, China-wood, coconut, cod, corn, cottonseed, croton, eucalyptus, geranium, grape seed, hemp, juniper, lard, lemon, linseed, mustard seed, menhaden, neat's foot, olive, oiticica, orange, palm, peanut, perilla, porpoise, rapeseed, seal, sesame, shark, sperm, tallow, train, soyabean, sunflower, teaseed, tung, walnut, whale, wool and the like. Blown oils such as blown castor oil, blown corn oil and blown soyabean oil may be utilized alone or in combination with other oils and oil derivatives or both.

Formates of the beta-alkoxy alkoxy alcohols may also be prepared by way of addition of carbon monoxide in the presence of a basic catalyst such as sodium methylate or other alkali metal alkoxides. The process may be generally described as involving mixing an alcohol with the alkoxide catalyst in amounts ranging from 0.5 to 10%, the catalyst usually being dissolved in an alcohol, and passing the resulting mixture, together with carbon monoxide, into a suitable reaction vessel. The reaction is preferably conducted under superatmospheric pressures ranging from, in the order of 1 to 1000, preferably 200 to 700 atmospheres and the temperature, between 0 and 100° C., and preferably 50 to 70° C. Detailed conditions for the reaction are described in the U. S. patent of John L. Brill, 2,117,600. The formate esters may be isolated by distillation from the reaction product after neutralizing the alkali methoxide with carbon dioxide.

Examples will now be given illustrating preferred embodiments of the invention, but it will be understood that the invention is not restricted to the particular details thereof. The parts are by weight unless otherwise indicated and conversions are based on the weight of ester over the weight of an alcohol introduced.

*Example 1.*—A mixture consisting of 212 parts of (methoxy methoxy)ethanol, 74 parts of methyl acetate and 5 parts of 29% sodium methylate in methanol was left at room temperature over night. After neutralizing the catalyst with carbon dioxide, the precipitated carbonate was filtered out and the reaction product was fractionally distilled through an efficient column. Beta-(methoxy methoxy)ethyl acetate, a water-white liquid having a boiling point of 95° C./38 mm., a density, 1.050 at 27° C., and being slightly soluble in water and miscible with methanol and benzene, was isolated in 39% yield.

*Example 2.*—A reaction mixture was prepared by mixing 106 parts of (methoxy methoxy)ethanol, 300 parts of methyl acetate and 5 parts of 29% sodium methylate in methanol. This was fractionally distilled until all methanol of reaction, distilling as methanol-methyl acetate azeotrope, was removed. The yield of beta-(methoxy methoxy)ethyl acetate, isolated as described in Example 1, amounted to 79%.

*Example 3.*—Rapid ester interchange was effected between methyl propionate and (methoxy methoxy)ethanol by distilling methanol of reaction as its methyl propionate azeotrope from a mixture comprising 300 parts of the ester, 106 parts of the (methoxy methoxy)ethanol and 5 parts of 29% sodium methylate in methanol. Fractional distillation of the product, after neutralizing the catalyst with carbon dioxide, gave in 93% yield, beta-(methoxy methoxy)ethyl propionate, a water-white liquid, having a boiling point of 108° C./38 mm., a density of 1.025 at 27° C., the ester being very slightly soluble in water and miscible with methanol and benzene.

*Example 4.*—Beta-(methoxy methoxyethyl)-borate was obtained by forming a mixture consisting of 282 parts of propyl borate and 106 parts of (methoxy methoxy)ethanol, which mixture was distilled at atmospheric pressure until most of the propanol formed in the reaction was removed. The remainder of the propanol and excess propyl borate was distilled under reduced pressure.

*Example 5.*—Ester interchange between methyl hydroxy-acetate and (methoxy methoxy)ethanol was effected under conditions simulating those employed in Examples 2 and 3. The reaction mixture consisted of 468 parts of methyl hydroxyacetate, 530 parts of (methoxy methoxy)ethanol and 1 part of 23% sodium methylate in methanol. Fractional distillation of the product gave beta-(methoxy methoxy)ethyl hydroxy acetate in 37% yield, having a boiling point of 144–148° C./15 mm., a density of 1.175 at 31° C., and was found to be miscible with water, methanol and benzene.

*Example 6.*—Methanol of reaction was distilled at ordinary pressure from a mixture consisting of 260 parts of methyl methoxyacetate, 265 parts of (methoxy methoxy)ethanol and 1 part of 23% sodium methylate. Without neutralizing the catalyst the product was distilled directly under vacuum. Beta-(methoxy methoxy) ethyl methoxy acetate, boiling point 132–133° C./24 mm. was isolated in 91.4% yield. It has a density of 1.100 at 31° C. and is miscible with water, methanol and benzene.

*Example 7.*—35 parts by volume of castor oil having an acid number of 2.38, 65 parts by volume of (methoxy methoxy)ethanol, and 23.3 grams of potassium soap per gallon of the reaction mixture are heated from ½ to 2 hours at 160° to 180° C. The resulting product contains appreciable quantities of the beta-(methoxy methoxy) ethyl ricinoleate.

In place of the sodium methylate of the examples, other basic ester interchange catalysts may be used such as sodium ethoxide, sodium glyceroxide, and alkali metal alkylates generally, as well as the alkali catalysts such as, for example, calcium oxide, sodium hydroxide and litharge. They may be used in amounts ranging between .001 to 5% and preferably between 0.25 and 0.75% of the ether reactants. At the lower temperature, a catalyst of the above nature is preferably used; at higher temperatures, however, say, 70° to 100° C. or above, catalysts, in some instances, are not necessary.

The ratio of ester to alcohol may vary through wide limits but usually it will be found that, as is illustrated by the examples, an excess of ester should be present and this is particularly true if an azeotrope is formed between the alcohol and the ester, as is the case when methyl acetate and methyl propionate are reacted with methoxy methoxy ethanol.

Esters obtained in accord with the invention have many important uses. They are, according to their boiling point, or melting point, excellent solvents or plasticizers in the lacquer arts for cellulose esters, cellulose ether, and resin lacquer compositions such as, for example, compositions containing cellulose acetate, cellulose propionate, cellulose acetopropionate, cellulose nitrate, ethyl cellulose, polyacrylic resins, polymethacrylic resins, polyvinyl resins, alkyd resins, urea formaldehyde resins, phenol-formaldehyde and the like. They are likewise useful as intermediates and as constituents in sizing and wetting compositions.

From a consideration of the above specification, it will be appeciated that many changes may be made in the details therein given without departing from the scope of the invention or sacrificing any of the advantages that may be derived therefrom.

We claim:

1. A process for the preparation of an organic ester of a β-(alkoxyalkoxy) alcohol which comprises reacting an ester with an alcohol having the formula:

$$RO\overset{R_1}{\underset{R_2}{C}}OC_nH_{2n}OH$$

wherein R is a hydrocarbon radical, $R_1$ and $R_2$ are radicals of the group consisting of hydrogen and hydrocarbon radicals and $n$ is an integer greater than 1.

2. A process for the preparation of an organic ester of a β-(alkoxyalkoxy) alcohol which comprises reacting, in the presence of a basic ester interchange catalyst, an ester with an alcohol having the formula:

$$RO\overset{R_1}{\underset{R_2}{C}}OC_nH_{2n}OH$$

wherein R is a hydrocarbon radical, $R_1$ and $R_2$ are radicals of the group consisting of hydrogen and hydrocarbon radicals and $n$ is an integer greater than 1.

3. The process of claim 2 in which the ester is an ester of an organic acid.

4. The process of claim 2 in which the ester is an ester of an inorganic acid.

5. A process for the preparation of an organic ester β-(alkoxymethoxy) alcohol which comprises reacting, in the presence of a basic ester interchange catalyst, an organic acid ester with an alcohol having the formula $ROCH_2OC_nH_{2n}OH$ wherein R is a hydrocarbon radical and $n$ is an integer greater than 1.

6. A process for the preparation of beta-(methoxy methoxy) ethyl ricinoleate which comprises heating a reaction mixture of castor oil, (methoxy methoxy) ethanol, and a potassium soap and thereby obtaining beta-(methoxy methoxy) ethyl ricinoleate.

7. A process for the preparation of beta-(methoxy methoxy) ethyl acetate which comprises reacting, in the presence of a basic ester interchange catalyst, (methoxy methoxy) ethanol with an alkyl acetate.

8. A process for the preparation of beta-(methoxy methoxy) ethyl hydroxy acetate which comprises reacting, in the presence of a basic ester interchange catalyst, (methoxy methoxy) ethanol and an alkyl hydroxy acetate.

9. A process for the preparation of beta-(methoxy methoxy) ethyl propionate which comprises reacting, in the presence of a basic ester interchange catalyst, (methoxy methoxy) ethanol with an alkyl propionate.

10. A process for the preparation of beta-(methoxy methoxy) ethyl acetate which comprises reacting approximately 2 moles of (methoxy methoxy) ethanol with 1 mole of methyl acetate in the presence of sodium methylate in methanol as the catalyst, after the reaction is complete neutralizing the catalyst with carbon dioxide and recovering the ester.

11. A process for the preparation of beta-(methoxy methoxy) ethyl propionate which comprises reacting approximately 300 parts of methyl propionate with approximately 106 parts of (methoxy methoxy) ethanol in the presence of approximately 5 parts of a 29% solution of sodium methylate in methanol, after the reaction is complete neutralizing the catalyst with carbon dioxide and recovering the ester.

12. A process for the preparation of beta-(methoxy methoxy) ethyl hydroxy acetate which comprises reacting approximately 468 parts of methyl hydroxy acetate with approximately 530 parts of (methoxy methoxy) ethanol in the presence of approximately 1 part of a 23% methanol solution of sodium methylate, after the reaction is complete neutralizing the catalyst with carbon dioxide and recovering the ester.

13. An ester of an acid and an alcohol having the formula, $$RO\overset{R_2}{\underset{R_1}{C}}OC_nH_{2n}OH$$

wherein R is a hydrocarbon radical, $R_1$ and $R_2$ are radicals selected from the group consisting of hydrogen and hydrocarbon radicals and $n$ is an integer greater than 1.

14. An ester of an organic acid and an alcohol having the formula, $ROCH_2OC_nH_{2n}OH$, wherein R is a hydrocarbon radical and $n$ is an integer greater than 1.

15. The ester of an organic acid and an alkoxy methoxy ethanol.

16. Beta-(methoxy methoxy)ethyl acetate, a water-white liquid having a boiling point of 95° C. at 38 mm. and a density of 1.050 at 27° C.

17. Beta-(methoxy methoxy)ethyl hydroxy acetate having a boiling point between 144 and 148° C. at 15 mm. and a density of 1.175 at 31° C.

18. Beta-(methoxy methoxy)ethyl recinoleate.

19. A process for the preparation of beta-(methoxy methoxy) ethyl ricinoleate which comprises heating to a temperature between 160 and 180° C. a reaction mixture of the following approximate composition: 35 parts by volume of castor oil, 65 parts by volume of (methoxy methoxy) ethanol, and 23.3 parts by weight of potassium soap and thereby obtaining beta-(methoxy methoxy) ethyl ricinoleate.

20. Beta-(alkoxy alkoxy) alkyl ricinoleate.

21. The reaction product of castor oil and an (alkoxy alkoxy) aliphatic alcohol.

22. The reaction product of castor oil and (methoxy methoxy) ethanol.

23. A beta-(methoxy methoxy) ethyl ester of an organic acid.

JOHN C. WOODHOUSE.
KENNETH E. WALKER.